United States Patent
Butler et al.

(10) Patent No.: US 8,131,861 B2
(45) Date of Patent: Mar. 6, 2012

(54) METHOD FOR CROSS-DOMAIN TRACKING OF WEB SITE TRAFFIC

(75) Inventors: Eric Butler, Portland, OR (US); John Teddy, Portland, OR (US); Martin Waugh, Portland, OR (US)

(73) Assignee: Webtrends, Inc., Portland, OR (US)

(*) Notice: Subject to any disclaimer, the term of this patent is extended or adjusted under 35 U.S.C. 154(b) by 982 days.

(21) Appl. No.: 11/437,989

(22) Filed: May 19, 2006

(65) Prior Publication Data

US 2006/0265495 A1    Nov. 23, 2006

Related U.S. Application Data

(60) Provisional application No. 60/683,251, filed on May 20, 2005.

(51) Int. Cl.
*G06F 15/16* (2006.01)
*G06F 15/177* (2006.01)

(52) U.S. Cl. ................................ 709/228; 709/220
(58) Field of Classification Search ............... 709/228, 709/220
See application file for complete search history.

(56) References Cited

U.S. PATENT DOCUMENTS

| | | | |
|---|---|---|---|
| 6,073,241 A | 6/2000 | Rosenberg et al. | |
| 2003/0037131 A1 | 2/2003 | Verma | |
| 2004/0015580 A1* | 1/2004 | Lu et al. ................ | 709/224 |
| 2006/0265495 A1* | 11/2006 | Butler et al. ........... | 709/224 |

FOREIGN PATENT DOCUMENTS

WO    0244869    6/2002

OTHER PUBLICATIONS

European Patent Office, Search Report of EP 06 11 4331, Sep. 13, 2006.

* cited by examiner

*Primary Examiner* — Jeffrey Pwu
*Assistant Examiner* — Shripal Khajuria
(74) *Attorney, Agent, or Firm* — Marger Johnson & McCollom, P.C.

(57) ABSTRACT

Web traffic reporting methods that rely upon third-party cookies suffer in accuracy when those tracking cookies are frequently refused by web users or deleted once they have been accepted. The invention described herein circumvents this problem by employing first-party cookies instead. This is accomplished by a client-side script that maintains the first-party cookie (as placed by the web site in question) and sends a site-maintained visitor ID to a tracking service for analysis. The effect is to improve the accuracy of traffic statistics that rely on that cookie.

16 Claims, 3 Drawing Sheets

METHOD FOR CROSS-DOMAIN TRACKING OF WEB SITE TRAFFIC

CROSS-REFERENCES TO RELATED APPLICATIONS

This application claims the benefit from U.S. Provisional Patent Application No. 60/683,251 filed May 20, 2005 whose contents are incorporated herein for all purposes.

BACKGROUND OF THE INVENTION

1. Field of the Invention

The present application relates to compiling and reporting data associated with activity on a network server and more particularly to generating and processing first party cookies for use with third party tracking services for the purposes of compiling and reporting web traffic data from visits by client nodes to a web site to be tracked.

2. Description of the Prior Art

The need for and benefits of tracking visitors' behaviors on a company's web site are well-established. Such information is indispensable to site design, marketing and sales strategies, and, eventually, maximizing return-on-investment for web-related expenses.

Establishing and maintaining a unique identifier for each visitor is fundamental to such tracking. A unique identifier provides the means for counting the number of unique visitors as well as for grouping behaviors by visitor and analyzing traffic by visitor segment. It behooves us to have a robust and accurate means for managing these identifiers.

The two main methods for collecting web traffic data are web server log file analysis and client-side tagging employing a third-party service. These differ, in large regard, in that the log files are created and analyzed by the same organization, whereas with JavaScript tagging it is most often a third-party service that analyzes the data.

In the first method (log files), one analyzes the log files from a web site's server, using data gleaned from that file to identify each visitor and attribute actions to them. Various techniques have been used (e.g., U.S. Pat. No. 6,112,238) including using the IP address of the visitor (sometimes in combination with the HTTP user agent field) and using an HTTP cookie. It is generally accepted that using cookies is the most accurate technique since cookies are distributed by the web site itself and can be guaranteed to be unique, and because they do not vary with dynamically assign IP addresses (DHCP) or with new installations of browsing software.

In the second method (client-side script), the web site includes a bit of client-side script (typically, JavaScript) in each page. This script executes on the visitor's computer resulting in an HTTP request to a third-party tracking service. The tracking service typically places its own cookie on the visitor's computer to uniquely identify the visitor. The salient difference between this cookie and one placed by the web site itself is the domain that owns the cookie. The tracking service cookie is a "third-party cookie" whereas the cookie from the web site is a "first-party cookie".

The problem with third-party cookies is that they are recognizable as coming from a third-party and they are generally understood to have no purpose useful to the visitor—they only serve to track the visitor. A first-party cookie, on the other hand, is used for many purposes that aid the visitor in browsing. It might contain shopping cart information, preferences, automatic login data, etc. As far as the visitor is concerned, third-party cookies are expendable whereas first-party cookies are useful.

Many web users are concerned with privacy, especially when it involves personally identifiable information such as email addresses, social security numbers, phone numbers, etc. With this in mind, web users either block the use of third-party cookies or manually or automatically remove such cookie on a periodic basis. Of course, removing third-party visitor-tracking cookies diminishes the efficacy of the tracking technique in that it reduces the accuracy of the counts based upon those cookies. Web users are less inclined to delete first-party cookies, since those cookies are perceived to be helpful.

Accordingly, the need remains for implementing tracking techniques that overcome the reliance on third-party cookies for web traffic tracking.

SUMMARY OF THE INVENTION

The method described herein replaces the use of third-party cookies with first-party cookies to avoid the abovementioned pitfall.

Web traffic reporting methods that rely upon third-party cookies suffer in accuracy when those tracking cookies are frequently refused by web users or deleted once they have been accepted. The invention described herein circumvents this problem by employing first-party cookies instead. This is accomplished by a client-side script that maintains the first-party cookie (as placed by the web site in question) and sends a site-maintained visitor ID to a tracking service for analysis. The effect is to improve the accuracy of traffic statistics that rely on that cookie.

The foregoing and other objects, features and advantages of the invention will become more readily apparent from the following detailed description of a preferred embodiment of the invention that proceeds with reference to the accompanying drawings.

APPENDIX shows an implementation of JavaScript code implementing preferred features of the invention.

DETAILED DESCRIPTION

Figure 1:
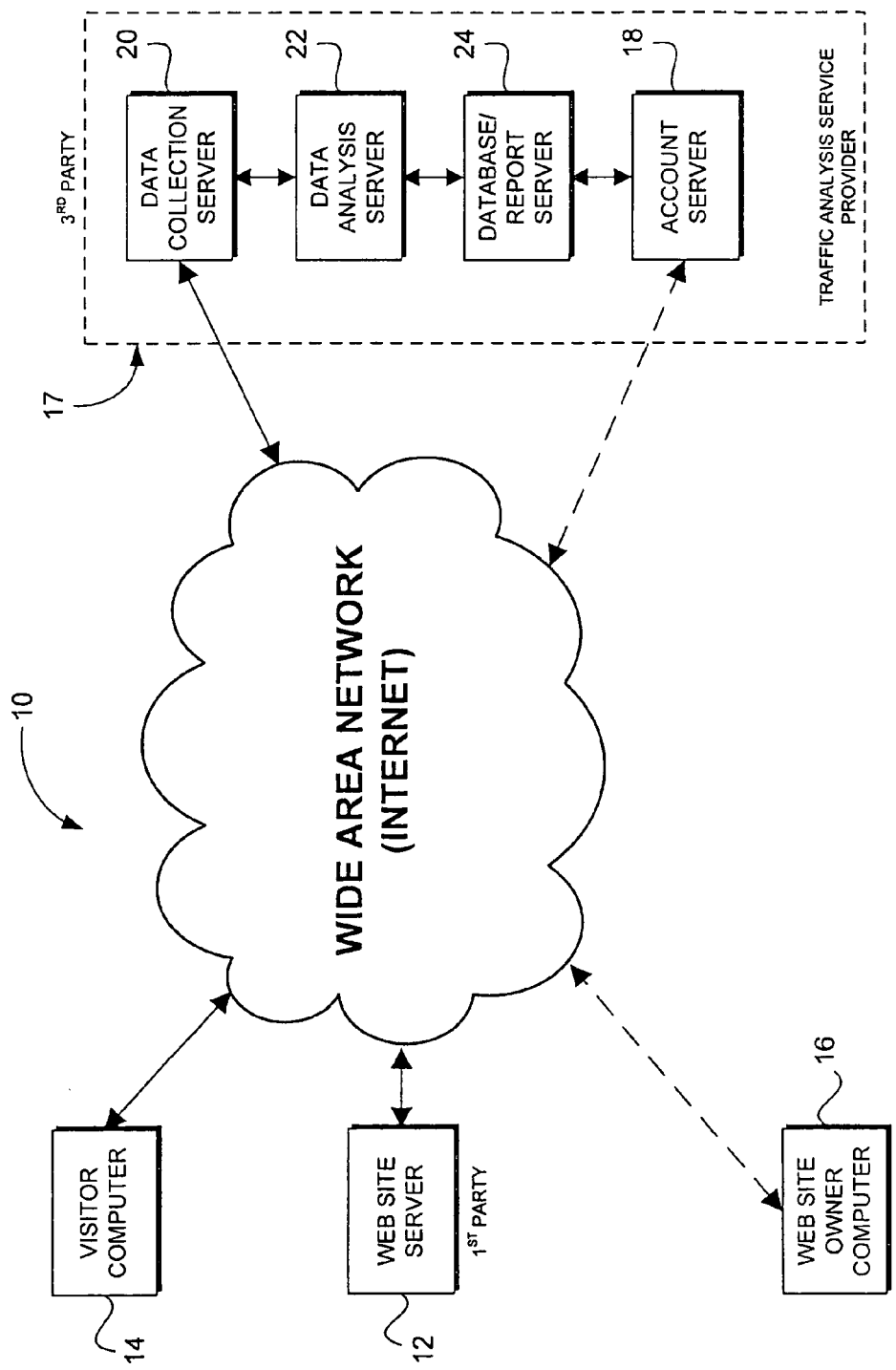
FIG. 1 is a general network architecture in which the invention operates.

Turning now to FIG. 1, indicated generally at 10 is a highly schematic view of a portion of the Internet implementing the present invention. Included thereon is a worldwide web page server 12 operated by a "first party" which generally serves content, such as web pages and the like, over the Internet. The server 12 has stored thereon a plurality of pages that a site visitor can download to his or her computer, like computer 14, using a conventional browser program running on the computer. Examples of the type of pages that a visitor can download include informational pages and pages that describe the business and the products or services that are offered for sale. In many circumstances, particularly when the first party operates a business through their web site, server 12 may facilitate that sale of such products or services online through an order placement scheme operated by the server 12.

As mentioned above, it would be advantageous to the seller to have an understanding about how customers and potential customers use server 12. As also mentioned above, it is known to obtain this understanding by analyzing web-server log files at the server that supports the selling web site. It is also known in the art to collect data over the Internet and generate activity reports at a remote server.

When the owner of server 12 first decides to utilize a remote service provider to generate such reports, he or she uses a computer 16, which is equipped with a web browser, to visit a web server 18 operated by the service provider. On server 18, the subscriber opens an account and creates a format for real-time reporting of activity on server 12.

To generate such reporting, server 18 provides computer 16 with a small piece of code, typically JavaScript code. The subscriber simply copies and pastes this code onto each web page maintained on server 12 for which monitoring is desired. When a visitor from computer 14 (client node) loads one of the web pages having the embedded code therein, the code passes predetermined information from computer 14 to a server or group of third party servers 17—also operated by the service provider—via the Internet. Server 17 (and those operating within its architecture such as servers 20, 22, 24, and 18) is referred to as a "third party" server because it is owned by the traffic analysis company rather than the company that owns and/or operates the website on server 12. This information mined from computer 14 can include, e.g., the page viewed, the time of the view, the length of stay on the page, the visitor's identification, etc. Such information, together with compilations of such data to form most popular pages, referring URLs, total number of visitors, returning visitors is also referred to herein as "technical data." Server 20 in turn transmits this information to an analysis server 22, which is also maintained by the service provider. The server 20 then passes the analyzed information to a database server 24 that the third party service provider also operates.

When the subscriber would like to see and print real-time statistics, the subscriber uses computer 16 to access server 18, which in turn is connected to database server 24 at the service provider's location. The owner can then see and print reports, like those available through the webtrendslive.com reporting service operated by the assignee of this application, that provide real-time information about the activity at server 12.

One known method for implementing this service is to load cookies on the computer of the visitor to the web page, where the cookies contain state information identifying that visitor (such as a unique visitor ID) and other information associated with that visitor (such as how many times the visitor has visited the particular web site). Despite the useful features that cookies provide to a user, there has been a recent backlash against using cookies as a perceived invasion of privacy as described in the Background section. Modern web browsers now have a feature that allows a user to block all cookies and/or block cookies originating from third party web sites. This feature has typically defeated the ability of web traffic analysis service providers from obtaining the information it needs to serve its customers.

In tracking user behavior on and across web sites, there are two important functions to be served: (1) uniquely identify the visitor to the web site; and (2) maintain traffic-tracking data for the visitor.

The process is as follows: (a) a visitor to a website requests a page from that site; (b) the web server for that site delivers the requested page, and that page contains a small client-side script to be executed by the browser; (c) the web browsing application (browser) loads the page and executes the embedded script; and (d) the script looks for a traffic-tracking cookie.

The cookie, according to a preferred implementation of the invention, contains three bits of data:

(1) ID—a string that uniquely identifies the visitor
(2) LV—the time of the last page request during the most recent visit by the visitor
(3) SS—the time of the first request of the most recent visit by the visitor If such a cookie exists, then the script compares the two times contained therein (LV and SS) against the current time. If the time of the most recent visit is more than 30 minutes prior to the present or the time of the beginning of the most recent visit is more than 8 hours prior to the present time, then the current request is considered to be the first request of a new visit. This is indicated by setting a "new visit" Boolean flag to true (to be used later), and setting in the cookie the time of the beginning of the most recent visit to the present time.

If the current day, month, or year is different from that in the last visit time in the cookie, then a "new day" Boolean flag is set indicating that this page request is the first request from the visitor in this day. This is used to count "daily unique" visitors.

If such a traffic-tracking cookie does not exist, the script tests to see if the browser is configured to accept cookies from the web site. This is typically done by attempting to set a temporary cookie and if that succeeds it is assumed that cookies are supported and the temporary cookie is deleted.

If cookies are not supported, a "cookies allowed" Boolean flag is set to false to indicate as much.

Otherwise, a new traffic-tracking cookie is created with the last visit and start of current visit times both set to the current time. And, the "new visit", "new day", and "cookies allowed" flags are all set to true.

This is the salient portion of the tracking script. The data it derives (the four Boolean flags and the unique visitor ID) can be sent to the originating web site or some other server for statistics gathering and analysis.

The flags are computed by the JavaScript and sent to the tag server as parameters on the request for the tracking GIF. In particular, the variable WT. vt_f_d (noted in the APPENDIX code) is a flag that indicates that this is the first hit for this visitor today (new day). The variable WT. vt_a_d tracks this across domains (or, as an "account rollup", as we describe it in places). The variable WT. vt_f indicates that this is a new visitor (if=1) or if cookies are not allowed (if=2). The variable WT. vt_f_a tracks this across domains ("account rollup").

Creation of Unique Visitor Identifier

In the algorithm described above, one should note that the unique identifier used to track the visitor is created by the JavaScript, such as the sample script included in APPENDIX. In a preferred implementation of the invention, if there is a third party cookie on the client machine, then the analysis server extracts it from the requests for the wtid.js file, and returns it in that file. If there is no such cookie, then the analysis server creates a unique ID. Only in the case that for some reason the server cannot return that file (like a network failure), does the client-side JavaScript create the "unique ID". The algorithm on the server would be created to be typically more robust than on the client, as it uses the client IP address and the time to the microsecond. However, this could still result in duplicate IDs. The fact that the JavaScript creates the unique identifier is important to the convenience for the web site owner. The part that creates the JavaScript-generated first party cookie is in function dcsFPC( ), specifically, lines 72-77 of the code shown in APPENDIX:

```
WT.co_f="2";
var cur=dCur.getTime( ).toString( );
for (var i=2;i<=(32-cur.length);i++){
    WT.co_f+=Math.floor(Math.random( )*16.0).toString(16);
}
WT.co_f+=cur;
```

The algorithm is essentially, time to the millisecond plus 18 random hexadecimal characters. So, two computers could come up with the same ID, if in the same millisecond, they both selected the same 18 digit hexadecimal number (of which there are about billion-trillion, or $10^{21}$) which is a near impossibility.

Another implementation could have the web site create the unique identifier and set a first-party cookie containing it. While that process works, it places an extra burden on the owner of the web site. Having the JavaScript contain all the necessary components encapsulates the solution to one small portion of code, and that code is provided by the tracking service.

Transitioning from Third-Party to First-Party Cookies

Assuming that the cookie flag is not set to false, and that first cookies are accepted, there remains a problem with transitioning from a system based on third-party cookies to one based on first-party cookies. Consider a web site that uses a third-party traffic tracking service. The tracking information for each visitor is tied to the unique identifier stored in the third-party cookie owned by the tracking service. When the web site transitions to using a first-party cookie instead with its own first party unique identifier, that tracking information is lost. Additionally, the count of unique visitors for a time period is greatly exaggerated since the third party tracking service may receive the newly first-party applied unique identifiers which are tracked as new users within conventional systems. It is desirable to not have such inaccuracies as a result of the transition.

The solution to this problem involves cooperation from the third-party. The rules for web browser behavior (RFC 2109—HTTP State Management Mechanism), however, prohibit one domain's pages (in this case, the first party) from accessing cookies set by another domain (in this case, the third-party). This seems to make the desired migration of cookies impossible.

Figure 2:
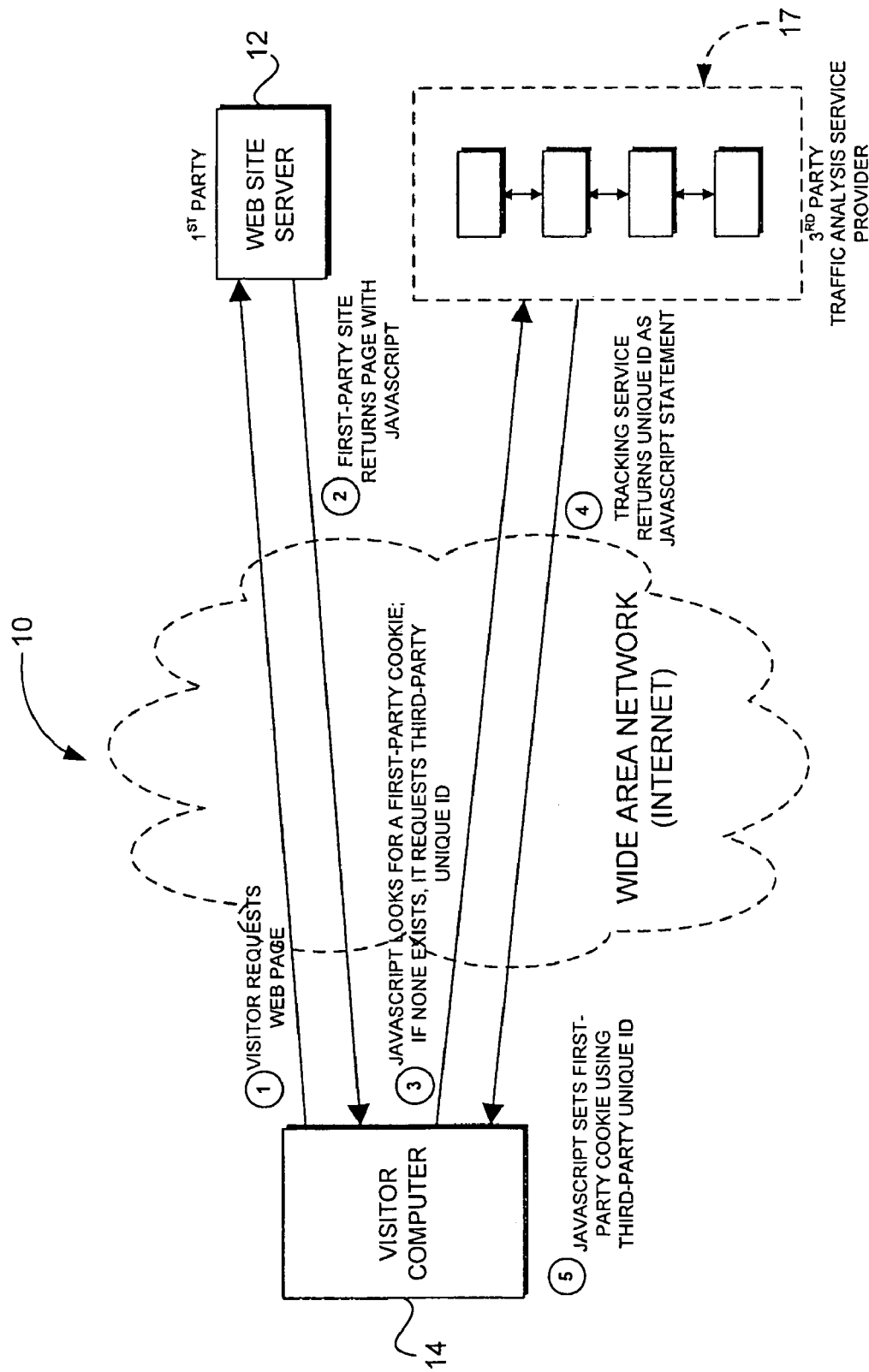
FIG. 2 is a schematic diagram showing the process flow of conversion of cookies between third party and first party cookies according to teachings of the present invention.

FIG. 2 illustrates a preferred solution for implementing tracking using a third-party to first-party transition. In summary, we solve this problem by having the third-party domain provide a mechanism for disclosing the unique tracking identifier for a visitor to a page displayed on that visitor's computer. The process of transitioning is as follows.

In a first step, identified within FIG. 2 by step (1), a visitor on computer 14 accesses the web site being tracked through a wide area network such as the Internet. The web page is stored on a web site server 12. The web site owner is using a tracking service operated on servers 17 by a third-party operator.

It may be that the third-party tracking operator had previously loaded a third-party cookie on computer 14 (or within a user profile thereon) in a previous visit to the web site on server 12 using means known in the art. In this way, tracking service 17 would then track user behavior on that web site using the third-party assigned unique ID, such as '3146FG89' to determine statistics such as time certain users stayed on a web site and how many unique visitors visited the site on any given day.

Responsive to the web page request from visitor computer 14, web site server 12 returns the web page requested together with extra code, such as JavaScript code, in step (2) that assists in performing the invention. The web site includes a bit of JavaScript code on each page delivered to its visitors.

In step (3), the web page sent from web server 12 is received at visitor computer 14 and displayed via a browser program operating on the computer. This step is performed by the APPENDIX script noted at line 139. The additional script also operates on the computer and browser to look for a first-party cookie associated with the site being viewed. If no cookie exists, then the script requests a third party unique ID using a one bit call embedded within the original web page. That is, this JavaScript uses HTTP to request a bit of text from the third-party tracking service and along with that request the third-party cookie is sent (as per HTTP protocol). The call is a request made to the third party tracking server 17.

Upon receiving the request from visitor computer 14, third-party server assigns in step (4) a third-party unique ID to the visiting computer 14, and returns the ID as a JavaScript statement. That is, the tracking service receives the request along with the attendant cookie containing the visitor's unique identifier; the service then extracts the unique identifier and returns it as a bit of text that forms a JavaScript statement that assigns the unique identifier to a JavaScript variable. This step is performed by the APPENDIX script noted at line 140. This ID is received by computer 14 and in step (5), and using the JavaScript statement embedded within the web page and returned to the visitor in step (2), causes the computer 14 to set a first-party cookie value using the third-party unique ID. That is, the page's JavaScript then uses that variable to set the value in a first-party cookie. In this way, the third-party and first-party IDs are always associated for statistics tracking purposes. Step (5) is performed by the APPENDIX script located at line 65 (which sets a variable), and line 109 (which sets the cookie using that variable).

Cross-Domain Tracking

The ability to transfer unique identifiers (or other per-visitor data) between a first-party and a third-party can also be used to maintain a single unique identifier that is common to a set of cooperating domains.

The need to share a common identifier among domains typically arises with larger companies that have multiple divisions or product lines. An example is a soft-drink company that has a domain for each brand of drink. The company is interested in understanding not only traffic patterns within the web site for a single product, but it is also interested in the traffic between each of the various brands. This provides information about which brands visitors tend to associate with each other, which may lead to opportunities for cross-selling.

However, since each brand has its own domain and those domains are disjointed from the perspective of the rules governing access to cookies, one such domain cannot read the contents of another domain's cookie. This seems to thwart cross-domain traffic tracking if the company employs first-party cookies for tracking.

We solve this problem by using a third-party (which may or may not be one of the brands' domains) to maintain a unique visitor identifier to be shared across cooperating domains. The third-party places a cookie on the visitor's computer and that cookie contains a cross-domain unique identifier for the visitor. Such a cookie is called a "shared third-party cookie".

The algorithm for sharing the common unique identifier is implemented using JavaScript to check for the presence of a first-party cookie on the client computer, and uses HTTP requests to the third-party tracking service to check for the presence of a third-party cookie. This process is outlined below, for each of the possible cases of new visitor and returning visitor to each site.

Figure 3:
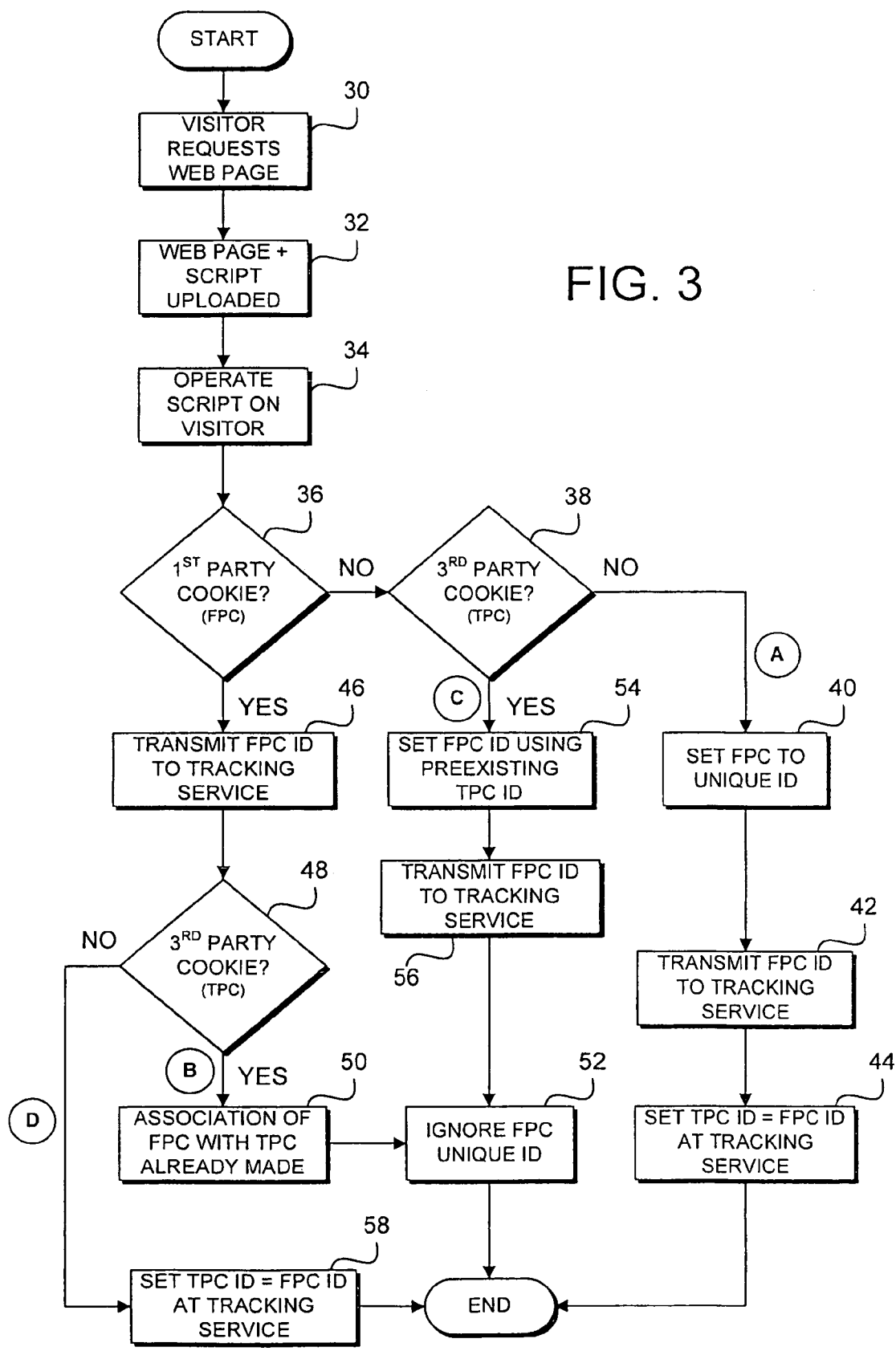
FIG. 3 is a flow diagram showing cross-domain tracking of user IDs for the purpose of web traffic analysis according to preferred embodiments of the invention.

FIG. 3 is a flow diagram illustrating an operative method conducted according to a preferred embodiment of the invention. The method shown is intended to associate first- with third-party unique ID's for the visitor in order to create a shared third party domain that can be used to track a single visitor across multiple shared-domains.

Assuming that a company has two or more brands (BrandA and BrandB) and a separate web site and domain for each, a visitor requests a web page from one of the brand web sites in block 30. The web page accessed is provided not only with script sufficient to properly display the page on the visitor's web browser, but also additional script as has been discussed previously and set forth further below. Responsive to the request in block 30, the web page and script is uploaded to the visitor computer in block 32. The script is then operated on the visitor's computer when received in block 34.

The following process operates on a visitor who performs the following steps:
A. Visits web site of Brand A for very first time.
B. Later visits Brand A web site again.
C. Then visits Brand B (associated with Brand A) web site for first time.
D. Fearing security issues, visitor then deletes third-party cookies from his computer but later visits Brand B web site.

By operation of a preferred implementation of the script on visitor computer 14, the script first determines in query block 36 (APPENDIX line 139) whether the visitor computer making the web page request includes a first party cookie (FPC). As this is the first visit to the web site of Brand A, there would be no such FPC stored on the visitor computer 14. Accordingly, the process proceeds to query block 38 (APPENDIX line 64) where the script then determines whether a third party cookie (TPC) is stored on the computer. Again, as this is the first visit to either Brand A or associated Brand B's web site, there would be no such (shared) third party cookie. The method proceeds along path (A) to block 40 (APPENDIX line ∩, with the variable that contains the cookie's value set by the Tag server or at lines 72-77) where the JavaScript attached to the web page downloaded operates on visitor computer 14 to create a unique identifier (e.g. using a high digit random number generator), and sets the FPC to the generated unique ID. The unique ID is then transmitted to the third-party tracking service in block 42 (APPENDIX line 316) in a bit request to third party tracking servers 17. The tracking servers 17 then set the third-party unique ID (TPC) with the unique identifier provided in block 44 (performed on the Tag server). In this way, the first party ID stored in the visitor computer 14 and the third party ID stored at the tracking server 17 are the same and can therefore be associated during tracking across related domains.

In a second visit by visitor operating from computer 14, the visitor again visits the Brand A web site. Blocks 30, 32, and 34 are again operated as above. Because a first-party cookie (FPC) had been set previous during the visitor's first visit to the Brand A web site, a FPC is detected by query 36 and the unique identifier mined from within the FPC is sent in block 46 during a one bit request to third party tracking servers 17. Query block 48 operates to detect the third-party cookie (TPC) already stored on the visitor computer 14. Operation proceeds along path (B) to block 50 where it is recognized at the tracking service servers 17 that an association between the FPC and TPC has already been made. The FPC unique ID received at the tracking service is thus ignored in block 52 as redundant of information already available.

In a third visit by a visitor from computer 14, the visitor this time visits the Brand B web site for the first time. Blocks 30, 32, and 34 are operated as above to serve the Brand B web site to visitor computer 14. As this is the first visit to Brand B, no first-party cookie (FPC) is detected in query block 36. The process proceeds to query block 38 where a (shared) third party cookie is detected. The process proceeds along path (C) to block 54 (APPENDIX line 40, except the variable originates from the Tag server) where the FPC ID is set to the preexisting TPC ID by script accompanying the Brand B web site download. The FPC ID is transmitted to the tracking service in block 56 (APPENDIX line 316) where it is promptly ignored in block 52 due to the pre-existing TPC.

A final fourth visit by a visitor from computer 14 occurs only after the visitor has purged the third-party cookies from his computer as is possible with modern browsers or manually. The visitor then requests download of a Brand B web page, thus triggering blocks 30, 32, and 34. The first-party cookie for Brand B, stored during operation of block 54 during the third visit, is detected in query block 36, the ID transmitted in block 46 (APPENDIX line 316), and a second query 48 of third-party cookies made. Because of the erasure, however, no third-party cookies are detected in query block 48. The process then proceeds along path (D) to block 58 where the third-party ID number is set to equal the pre-established FPC ID at the tracking service. Block 48, 50, 52, and 58 steps are performed on the Tag server.

The four examples detailed above, and set forth in the flow diagram of FIG. 3, are noted below:

Example A

New visitor to BrandA.com; Client computer has neither a first-party cookie (FPC) nor a shared third-party cookie (TPC).
1) JavaScript recognizes that FPC doesn't exist, so it checks for TPC by making a request to the third-party tracking service. There is no TPC.
2) JavaScript sets the FPC with a newly created unique identifier and informs the third-party tracking service that a new FPC has been created.
3) The third-party tracking service sets the TPC with the unique identifier provided.

Example B

Returning visitor to BrandA.com; Client computer has both a first-party cookie (FPC) and a shared third-party cookie (TPC).
1) JavaScript recognizes that FPC exists, so it sends the unique identifier in the existing FPC to the third-party tracking service.
2) The third-party tracking service already has a TPC on the client's computer, so it ignores FPC unique identifier.

Example C

New visitor to BrandB.com; Client computer has no first-party cookie (FPC) but does have a shared third-party cookie (TPC).
1) JavaScript recognizes that FPC doesn't exist, so it checks for TPC by making a request to the third-party tracking service. There is a TPC.
2) JavaScript sets the FPC using the unique identifier from the TPC, then sends the unique identifier to the third-party tracking service.
3) Tag server already has a TPC, so it ignores the FPC unique identifier.

Example D

Returning visitor to either BrandA.com or BrandB.com who regularly deletes TPC's; Client computer has a first-party cookie (FPC) but no shared third-party cookie (TPC).
1) JavaScript recognizes that FPC exists, so it sends the unique identifier in the existing FPC to the third-party tracking service.
2) The third-party tracking service has no TPC on the client's computer, so its sets one with the unique identifier from the FPC.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. A method for tracking activity on a web site comprising: storing a web site on a first server coupled to a network, said website belonging to a first-party domain; using a second server at a second domain, different from the first-party domain, to place a third-party cookie on a visitor computer to track activity of the visitor computer on the first server; loading a web page from the web site on the visitor computer; executing computer code associated with the web page at the visitor computer; sending a data request to the second server responsive to execution of the computer code; generating identification code at the second server responsive to the data request and returning the identification code from the second server to the visitor computer; and associating at the visitor computer the identification code with a first-party cookie, said first party cookie being associated with the first-party domain; again loading a web page from the web site on the visitor computer; storing information about the visit to the web site in the first-party cookie; opening the first-party cookie at the visitor computer; and sending the information about the web visit to the second server.

2. The method of claim 1 wherein said method further comprises associating visitor computer activity on a third server with the identification code.

3. The method of claim 1 wherein opening the first-party cookie at the visitor computer and sending the information about the web visit to the second server are done in response to execution of computer code associated with at least one of the web pages loaded from the web site on the visitor computer.

4. The method of claim 1 wherein said method further includes associating information at the second server from both the third-party cookie and the first-party cookie with the identification code.

5. A method for tracking a visitor computer across multiple domains on a network comprising: loading a web page from a first web site at a first domain on the visitor computer; reading an identification code in a first-party cookie set by the first domain at the visitor computer; sending a data request to a server coupled to the network; sending the identification code with the data request; creating a third-party cookie using the identification code; placing the third-party cookie on the visitor computer; loading a web page from a second web site at a second domain on the visitor computer; sending the third party cookie to the server; and storing visitor computer activity across both domains at the server.

6. The method of claim 5 wherein the stored activity at the server is associated with the identification code.

7. The method of claim 5 wherein the data request is an image request.

8. The method of claim 5 wherein after storing visitor computer activity across both domains at the server the third party cookie is deleted or the visitor computer begins to reject the third party cookie, said method further comprising: loading another page from one of the first and second web sites; reading the identification code in the first party cookie associated with the one web site; sending the identification code to the server; and creating a new third party cookie using the identification code.

9. A method for tracking activity on a web site comprising: providing a script for embedding in downloadable content and configured to be downloaded by a visitor computer over a network from a first party, the script operable to: obtain a unique ID; assign the unique ID to a first party cookie associated with the downloadable content of the first party; and transmit a communication over the network to a third party tracking server; receiving the communication at the third-party tracking server and, responsive to receipt, causing a third party cookie having the unique ID to be set on the visitor computer; and maintaining a record of visitor computer activity on the web page using the third party cookie.

10. The method of claim 9, further including: embedding a script on second downloadable content downloaded by a visitor computer from a second party; responsive to the script on the second downloadable content, determining that the third party cookie having the unique ID has been set on the visitor computer and setting a first party cookie associated with the second web page of the second domain using the unique ID of the third party cookie.

11. The method of claim 9, wherein the step of obtaining a unique ID includes generating the unique ID on the visitor computer, wherein the communication includes the unique ID.

12. The method of claim 9, wherein the step of obtaining a unique ID includes generating the unique ID on the third party tracking server.

13. The method for claim 9, further including: determining that the third party cookie is no longer set on the visitor computer and, responsive to the determination, causing the unique ID to be transmitted to the web tracking server; responsive to receipt of the unique ID at the web tracking server, causing the third party cookie having the unique ID to be set on the visitor computer.

14. A method for tracking activity on a network resource comprising: providing one or more scripts for embedding on a web page and configured to be downloaded by a visitor computer from the network resource, the scripts operable to: transmitting a communication to a third party tracking server, receiving a response from the third-party tracking server along with an ID, storing the ID in a first party cookie associated with the network resource, and storing the ID in a third party cookie associated with the tracking server.

15. The method of claim 14, wherein the network resource is a web page.

16. The method of claim 15, further including determining that settings of a visitor computer prevent operation of one or more of the storing steps, and not performing one or more of the storing steps responsive to the determining step.

* * * * *